United States Patent [19]
Albrecht

[11] 3,761,852
[45] Sept. 25, 1973

[54] DEVICE FOR SEPARATING GAS BUBBLES FROM A LIQUID

[75] Inventor: Cord Albrecht, Erlangen, Germany

[73] Assignee: Siemens Aktiengesellschaft, Berlin/Munich, Germany

[22] Filed: Apr. 30, 1972

[21] Appl. No.: 257,990

Related U.S. Application Data

[60] Continuation of Ser. No. 53,316, July 8, 1970, abandoned, which is a division of Ser. No. 753,646, Aug. 19, 1968, abandoned.

[30] Foreign Application Priority Data
Aug. 22, 1967 Germany............ P 16 19 918.1

[52] U.S. Cl....... 336/58, 55/202, 55/206; 261/113, 336/60, 336/DIG. 1
[51] Int. Cl............................................ B01d 53/00
[58] Field of Search.................. 55/52, 193, 202, 55/206, 446; 261/113, 123; 336/57–62

[56] References Cited
UNITED STATES PATENTS

| | | | |
|---|---|---|---|
| 604,018 | 5/1898 | Carmichael | 261/123 |
| 641,684 | 1/1900 | Ferry | 261/113 |
| 2,831,173 | 4/1958 | Whitman | 336/58 |
| 3,363,207 | 1/1968 | Brechna | 336/57 X |
| 3,367,638 | 2/1968 | Leva | 261/113 |
| 3,414,248 | 12/1968 | Iwanaga et al. | 261/122 |
| 1,984,617 | 12/1934 | Williams | 261/123 |

FOREIGN PATENTS OR APPLICATIONS
1,173,965  12/1969  Great Britain................. 336/DIG. 1

Primary Examiner—Samih N. Zaharna
Assistant Examiner—Richard W. Burks
Attorney—Arthur E. Wilfond

[57] ABSTRACT

Described is a device for separating gas bubbles contained in a liquid from said liquid. The device comprises several plates extending essentially parallel to each other and provided with openings. The plates are arranged above each other and are placed diagonally to the direction of the gas bubble movement in the liquid. The openings of one plate are displaced from the openings of the adjacent plates. The openings on the plate sides which face into the movement direction of the bubbles, are enclosed by material protrusions. The areas of those plate sides which lie between these openings are designed as coherent gas collecting and diverting areas. The device is particularly useful in superconducting magnetic coils.

10 Claims, 14 Drawing Figures

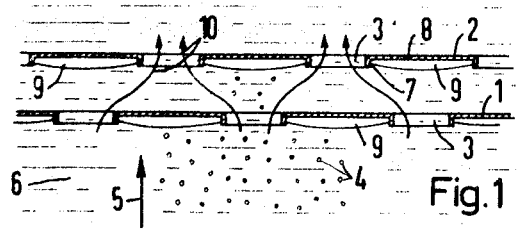
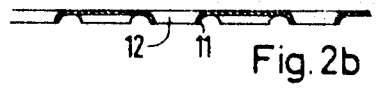
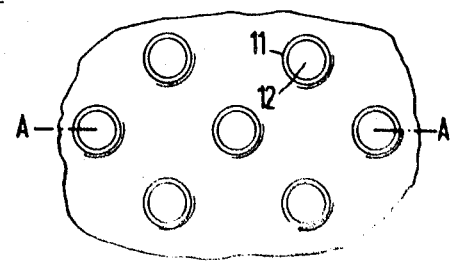
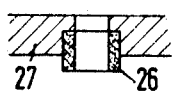
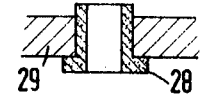
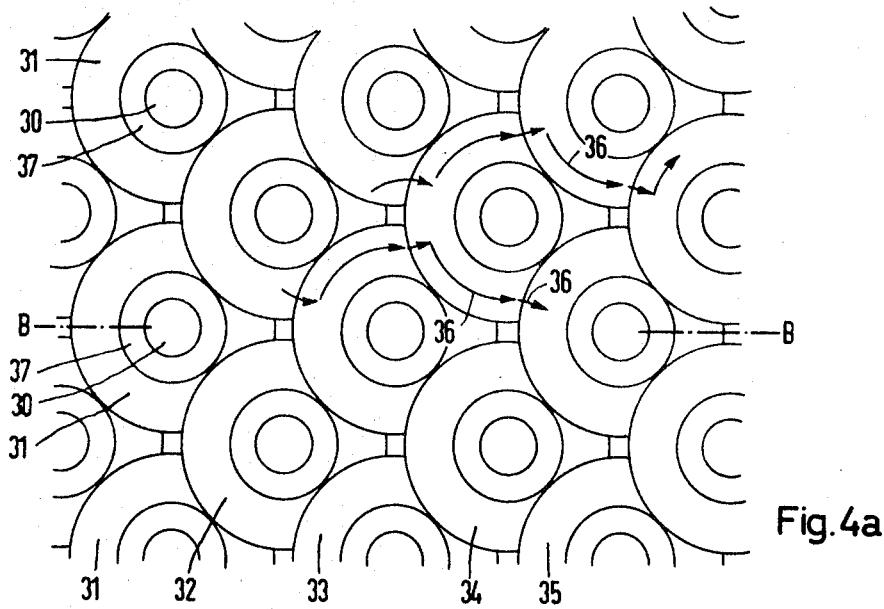
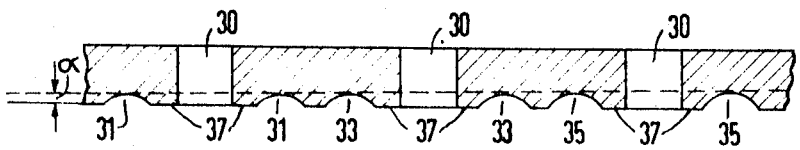

DEVICE FOR SEPARATING GAS BUBBLES FROM A LIQUID

This is a continuation of application Ser. No. 53,316, filed July 8, 1970 and now abandoned, which is a divisional application of application Ser. No. 753,646 filed Aug. 19, 1968 and now abandoned.

In industrial application of liquids, the gas bubbles contained in the liquids sometimes can create disturbing effects. This is particularly the case when low boiling liquids such as liquid helium, liquid nitrogen or liquid hydrogen, are used to cool electrical conductors, e.g. in low temperature magnet coils or low temperature electrical machines. If a local heating of the liquid occurs, the liquid begins to boil. The resulting gas bubbles may rise up through the liquid and impair, during their entire travel through the liquid, the conditions for heat transfer and thus the cooling effect of the liquid. This is a result of gas bubbles reducing the heat transfer between the coolant and the surface to be cooled.

The invention resolves this problem by providing a device for separating gas bubbles contained in a liquid from the liquid so that the disturbing effect of the gas bubbles is largely eliminated.

To this end and in accordance with my invention, several essentially parallel plates, provided with openings, are so arranged diagonally to the movement direction of the gas bubbles in the liquid, that the openings of one plate are displaced relative to the adjacent plate. The openings are surrounded by a protrusion of material on the side of the plate opposite to the movement direction of the bubbles. The regions of the plate sides between the openings are designed as coherent gas collecting and gas removal regions.

The gas bubbles rising in the liquid below the device, which do not escape through the openings of the first plate, are retained by the material protrusions which surround the openings of said plate, pass into the gas collecting regions on the bottom side of the plates and are continuously led off from the liquid or transferred to a region of the liquid where they no longer cause any harm. Since the openings of adjacent plates are mutually displaced, the gas bubbles passing through the openings of the first plate are caught by the following plate. In most cases, two plates suffice in accordance with the device of my invention, to separate the gas bubbles from the liquid. More than two plates, however, may be provided.

The openings are preferably circular and large enough so as not to impair the free flow or convection of the liquid through the device. In a preferred, especially easy to produce embodiment of the present invention, the plates have a smooth surface between the material protrusions. This smooth surface constitutes the gas collecting and removal area and is arranged diagonally to the movement direction of the gas bubbles in the liquid. The gas may glide along the smooth surface. In this embodiment, the material protrusion may be formed by projections of the plates which occur, during the production of the openings, or they may be produced in the openings by special techniques.

In another embodiment of the invention, the gas collecting and removing areas may be machined, as depressions, into the plate surfaces which are opposed to the direction of the gas bubble movement. When the depth of the depression increases in the direction which is intended for the removal of the gas bubbles, the plates may be positioned essentially perpendicular to the direction of the gas bubble movement in the liquid.

The gas collecting and removing areas provided in the plates may be intersecting depressions which annularly surround the openings and of increasing depth in the direction of gas removal. The plate surfaces may alternatively be provided, between the openings, with ducts whose depth increases in the direction of gas removal.

The device of the present invention is particularly suitable for use in connection with a superconducting magnet coil which is cooled by liquid helium. The gas bubbles occurring in the liquid helium are particularly disturbing to the cooling of the winding of said coils.

The following FIGS. and embodiment examples describe the present invention in greater detail:

FIG. 1 is a schematic illustration of the mode of operation of the device of the invention;

FIGS. 2a and 2b show an embodiment of a plate, provided with openings, used according to the present invention;

FIGS. 3a to 3d are various embodiments of insertions in the openings of a plate according to the present invention;

FIGS. 4a and 4b show a plate for the device of the present invention, which is provided with intersecting annular depressions;

Figure 5A:
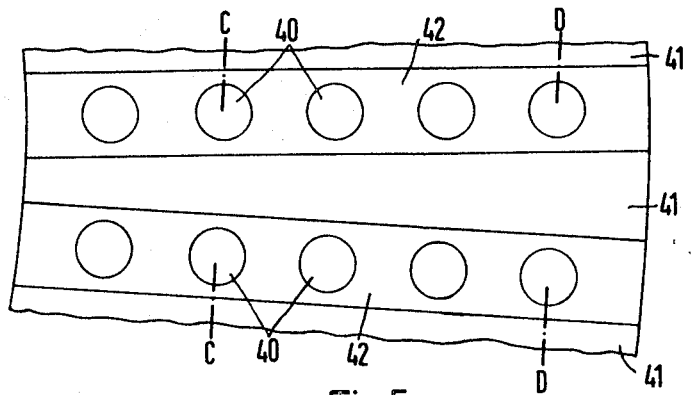
FIGS. 5a to 5c show a plate for the present device, which is provided with ducts between the openings.

FIG. 1 is a schematic illustration of two plates 1 and 2, in section, which are parallel to each other and provided with circular openings 3. The two plates are arranged one above the other, diagonally to the movement direction of the gas bubbles 4, which rise in the direction of the arrow 5 in the liquid 6 which may be comprised of liquid helium and which surrounds the plates 1 and 2. The openings 3 of the plates 1 and 2 are displaced relative to each other so that they are not directly superimposed, but rather that above each opening of the plate 1, is a portion of plate 2, which has no opening. The openings 3, on the side of each plate opposed to the direction 5 of the movement of the gas bubble 4, are annularly surrounded by bulging material protrusions 7. The bubbles 4, rising in the liquid 6, are retained by the protrusions 7 at the surface portions 8 of plates 1 or 2, between openings 3, and are prevented from further rising in the liquid. Larger gas bubbles collect below the plate portions 8. When the gas collecting surfaces 8 are sufficiently smooth, and inclination of plates 1 and 2, by a few degrees from the horizontal, is sufficient to direct the collected gas into a desired direction. The gas slides thereby around the material protrusions 7, along the surface of the plate portions 8. Since the bubbles 4, which pass through the openings of the plate 1 are caught at plate 2, even two plates are sufficient to largely separate the gaseous phase in liquid 6 from the liquid phase. The convection or flow of the liquid 6 in direction of the arrow 10 is virtually unhampered by the plates 1 and 2.

FIG. 2a shows, in a top view, the side, opposed to the movement direction of the gas bubbles in the liquid, of a particularly smooth plate to be used in a device of the present invention.

FIG. 2b is a cross section through the plate along line A—A of FIG. 2a. The plate may be comprised, e.g. of sheet metal or synthetic material. The material protrusions 11 which surround the circular openings 12 in the plate are formed through the bulging of the plate material. The material protrusion 11 may be overflows from punchings, flanges or pressure bulges which may be produced during specific manufacture of the plate, as for example, by stamping or pressing simultaneously with the openings 12.

In the device of the present invention, such plates are arranged diagonally to the direction of the gas bubble movement in the liquid and particularly employed in those instances where the plates only serve for separation of the gas bubbles and do not have to serve additional functions, such as supporting.

In other embodiments of the device according to the invention, the material elevations which surround the openings of the plates may be formed through insertions in the openings.

FIG. 3a shows an annular hollow type rivet 21 used as an inset in an opening of a plate 22, which may be comprised, for example, of metal or a plastic. FIG. 3b shows a tubular rivet comprised of metal 23 and insulating synthetic material 24, in an opening of a plate 25. In the embodiments of FIGS. 3c and 3d, variously shaped tubular pieces 26 and 28 are pressed respectively into an opening of the plates 27 and 29. The tubular portions may be made of metal or ceramic. Plates provided with such insets have the advantage that an appropriate selection of said insets may vary the level of the material protrusions and may be adjusted to the most varied operating conditions.

In the plate used for another embodiment of the invented device and shown in FIGS. 4a and 4b, the gas collecting and diverting areas are formed, as depressions, into the plate surfaces which are counter to the direction of the gas bubble movement in the liquid, that is, the depressions face the upstream side of the gas bubbles. FIG. 4a shows a top view of the plate surface. FIG. 4b is a cross section through the plate along line B—B in FIG. 4a. The openings 30 of the plate are provided with annular, intersecting depressions 31 to 35, of increasing depth in the direction of the gas diversion. In FIGS. 4a and 4b, it is assumed that the gas bubbles are diverted from left to right with the plate arranged perpendicularly to the direction of the bubble movement in the liquid. Therefore, the depressions 32 are machined somewhat deeper into the plate then depressions 31, the depressions 33 somewhat deeper than the depressions 32, the depressions 34 somewhat deeper than the depressions 33 and depressions 35 also somewhat deeper than depressions 34. This can be clearly seen in FIG. 4b. The intersecting of the depressions produces, at the plate surface, a slightly step-like structure along which the gas to be diverted may flow, as seen in FIG. 4a by the drawn lines, in the direction indicated by arrows 36. The intersecting depressions hence form interconnected gas withdrawal paths which rise by an angle of several degrees (angle $\alpha$ in FIG. 4b) with respect to the horizontal. The depressions 31 to 35 may be milled, for example out of a full plate. The material protrusions which surround the openings are indicated as 37.

Figure 5B:
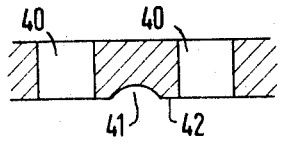
Figure 5C:
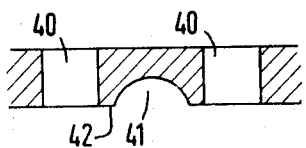

FIGS. 5a to 5c show another plate in accordance with the present invention, wherein the gas collecting and diverting areas are machined into the plate surface which is opposed to the direction of the gas bubble movement. FIG. 5a is a top view of this surface of the plate; FIG. 5b is a cross section through the plate along section line C—C; FIG. 5c is a cross section through the plate along the section line D—D. Ducts or channels 41 whose depth increases in the direction in which the gas is to be diverted, are between the openings 40 of said plate. In FIG. 5a this direction proceeds from left to right as is evident from FIGS. 5b and 5c which clearly show that the depth of the channel increases in this direction. The material protrusions which surround the openings 40, form coherent bridges 42 in this embodiment. Plates which have the shape shown in FIGS. 5a to 5c are so arranged above each other in a displaced relationship, that the openings of the lower plate, positioned within a bridge 42, are positioned below a gas withdrawal channel 41 of the following plate. This plate shape is particularly suitable where it is required that the plates have the shape of circular rings. The bridges 42 and channels 41 can then proceed in a radial direction so that the collected gas is removed toward the outer periphery of the circular ring. The ducts 41 may be removed from the full plate, for example by metal cutting.

Figure 6A:
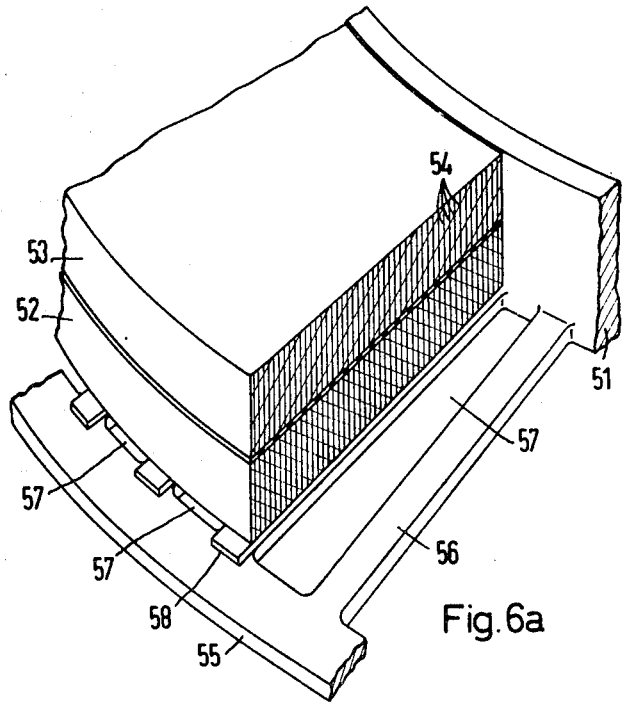
FIGS. 6a and 6b show a portion of a superconducting coil with a disc-shaped winding with the device of my invention in such a coil.

FIG. 6a shows a section of a superconducting coil in which the device of the present invention can be used to advantage. The coil is comprised of several disc-shaped windings with a vertical axis. FIG. 6a shows a double disc winding, comprised of two partial windings 52 and 53, wound upon an annular coil body 51. A tape-like conductor may be used for the disc winding and consist of several superconducting wires which run parallel to each other and are embedded into a band with good normal conducting electrical properties. Inside the disc windings, the individual windings 54 of the band are superimposed in the form of a spiral. The coil winding is so designed that the liquid helium, in which the coil is immersed during operation, can penetrate between the individual windings and thus is able to cool the inside of the winding. Appropriate insulating spacers are between the windings 54, cooling passages being left between the spacers. To absorb the forces exerted within the coil in an axial direction, a spoke flange preferably comprised of alloy steel and which consists of an outer ring portion 55 and of spokes 56 connecting the ring portion of the coil body 51 is provided. Windows 57 are provided between the individual spokes for the convection of the liquid helium, which surrounds and penetrates the winding. The spokes are insulated against the winding 52 by strips 58 of an insulating material. An additional disc winding lies below the flange which is not shown, in the interest of clarity. The entire coil is located in a cryostat which is also not shown in the FIG.

Figure 6B:
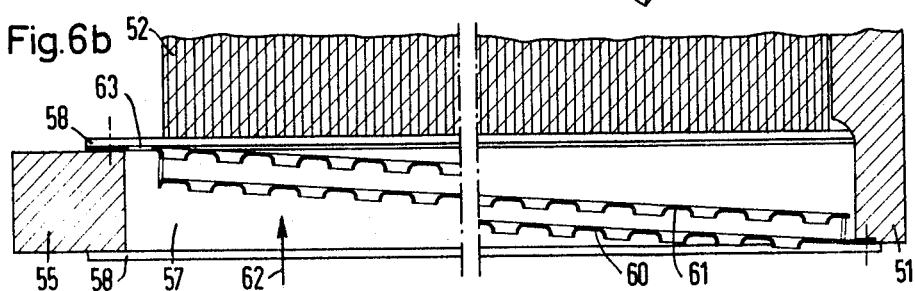

In order to keep any helium gas bubbles which may occur, during the operation of the coil in the coil winding below the spoke flange, from windings 52 and 53, I insert a device in accordance with my invention in the windows 57 between the spokes 56 of the spoke flange. This is seen in detail in FIG. 6b. In window 57, between two spokes of the spoke flange, two plates 60 and 61, according to FIGS. 2a and 2b, are arranged above one another, diagonally to the movement direction 62 of the gas bubbles rising in the liquid helium. The two places are attached to each other, to the ring portion 55 of the spoke flange and the the coil body 51, by appropriate means. The gas bubbles caught by the plates 60 and 61 are diverted continually in a radial direction and pass through the openings 63 into an area of liquid helium outside the coil winding, and thus can no longer affect the cooling of the coil. The device of my invention does not increase the space required for the coil. The transmittal of force between the coil portions is effected via the spoke flange and is not impaired.

Obviously, many modifications and variations of the invention, as hereinbefore set forth, may be made without departing from the spirit and scope thereof and only such limitations should be imposed as are indicated in the appended claims. For instance, differently designed plates may be similarly employed in superconducting coils.

I claim:

1. A superconducting magnetic coil in a cooling bath of liquid helium, comprising a superconducting magnetic coil consisting of several superimposed disc windings with a vertical axis, said disc windings are permeable to said liquid helium, a device for separating gas bubbles contained in said liquid helium from said liquid helium situated between said superimposed windings of the magnetic coil, said device comprising several plates diagonally to the direction of the gas bubble movement in the liquid, said plates extending essentially parallel to each other and provided with openings arranged above each other, so that the openings of one plate are displaced from the openings of the adjacent plates, the openings on the plate side facing into the direction of the gas bubble movement are enclosed by material protrusions and the areas of those plate sides which are between said openings act as coherent gas collecting and diverting areas, thereby preventing gas bubbles from contacting said coil.

2. A superconducting magnetic coil in a cooling bath of liquid helium, comprising a superconducting magnetic coil consisting of several superimposed disc windings with a vertical axis, said disc windings are permeable to said liquid helium, a device for separating gas bubbles contained in said liquid helium from said liquid helium situated between said superimposed windings of the magnetic coil, said device comprising several plates perpendicular to the direction of the gas bubble movement in the liquid, said plates extending essentially parallel to each other and provided with openings arranged above each other, so that the openings of one plate are displaced from the openings of the adjacent plates, the openings on the plate side facing into the direction of the gas bubble movement are enclosed by material protrusions and the areas of those plate sides which are between said openings have a smooth surface and act as coherent gas collecting and diverting areas, thereby preventing gas bubbles from contacting said coil.

3. The device of claim 1, wherein the openings are circular.

4. The device of claim 1, wherein the plates between the material protrusions have a smooth surface, said surface acts as a collecting and diverting area and is arranged diagonally to the direction of the gas bubble movement in the liquid.

5. The device of claim 4, wherein the material protrusions are formed through a bulging of the plates.

6. The device of claim 4, wherein the material elevations are formed through insets in the openings of the plates.

7. The device of claim 2, wherein the gas collecting and diverting areas formed as depressions in the plate surfaces are opposed to the direction of the bubble movement.

8. The device of claim 2, wherein the depressions annularly surrounding the openings intersect and increase in depth in the direction of the gas withdrawal.

9. The device of claim 2, wherein channels whose depth increases in gas diverting direction are at the plate surfaces, between the openings.

10. The superconducting magnetic coil arrangement of claim 1, wherein the coil is situated on an annular coil body having an outer ring portion and spokes connecting said annular coil body with said outer ring portion, and the device for separating gas bubbles is situated between the spokes in the plane of said outer ring portion.

* * * * *

UNITED STATES PATENT OFFICE
CERTIFICATE OF CORRECTION

Patent No. 3,761,852          Dated September 25, 1973

Inventor(s) CORD ALBRECHT

It is certified that error appears in the above-identified patent and that said Letters Patent are hereby corrected as shown below:

In the heading to the printed specification, line 6,

"Filed: Apr. 30, 1972" should read --Filed: May 30, 1972--

Signed and sealed this 30th day of July 1974.

(SEAL)
Attest:

McCOY M. GIBSON, JR.
Attesting Officer

C. MARSHALL DANN
Commissioner of Patents